United States Patent
Pursifull

(10) Patent No.: US 8,348,807 B2
(45) Date of Patent: *Jan. 8, 2013

(54) METHODS AND SYSTEMS FOR HEATING TRANSMISSION FLUID

(75) Inventor: Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/449,846

(22) Filed: Apr. 18, 2012

(65) Prior Publication Data

US 2012/0198819 A1 Aug. 9, 2012

Related U.S. Application Data

(63) Continuation of application No. 12/365,497, filed on Feb. 4, 2009, now Pat. No. 8,162,797.

(51) Int. Cl.
*F16H 59/00* (2006.01)
(52) U.S. Cl. ........................................................ 477/98
(58) Field of Classification Search ....................... 477/98
See application file for complete search history.

(56) References Cited

U.S. PATENT DOCUMENTS

| | | | |
|---|---|---|---|
| 5,730,089 A | 3/1998 | Morikawa et al. | |
| 6,511,396 B1 | 1/2003 | Tanizawa et al. | |
| 6,537,178 B1 | 3/2003 | Takizawa et al. | |
| 6,647,326 B2 | 11/2003 | Nakamori et al. | |
| 6,695,743 B2 | 2/2004 | Tanaka et al. | |
| 7,210,522 B2 * | 5/2007 | Gruian | 165/202 |
| 7,533,635 B2 * | 5/2009 | Bradley et al. | 123/41.29 |
| 7,669,558 B2 * | 3/2010 | Claypole et al. | 123/41.51 |
| 2011/0111920 A1 * | 5/2011 | Gooden et al. | 477/98 |
| 2011/0172890 A1 * | 7/2011 | Ulrey et al. | 701/54 |
| 2011/0251019 A1 * | 10/2011 | Ulrey et al. | 477/98 |

* cited by examiner

*Primary Examiner* — Dirk Wright
(74) *Attorney, Agent, or Firm* — Julia Voutyras; Alleman Hall McCoy Russell & Tuttle LLP

(57) ABSTRACT

Systems and methods are provided for heating transmission fluid in a vehicle, the vehicle comprising an engine and a transmission, the engine including a heat exchanger. One example method comprises, during a first engine running condition, operating an auxiliary transmission fluid pump to generate pressure in the transmission fluid and pump transmission fluid to the heat exchanger, and during a second condition where the engine is not running, operating the auxiliary transmission fluid pump to generate pressure in the transmission fluid and pump transmission fluid to the heat exchanger.

17 Claims, 3 Drawing Sheets

METHODS AND SYSTEMS FOR HEATING TRANSMISSION FLUID

CROSS REFERENCE TO RELATED APPLICATIONS

The present application is a continuation of U.S. patent application Ser. No. 12/365,497 filed Feb. 4, 2009, the entire contents of which are incorporated herein by reference for all purposes.

FIELD

The present application relates to methods and systems for heating transmission fluid provided to an engine transmission.

BACKGROUND AND SUMMARY

Vehicles have been developed to perform an idle-stop when idle-stop conditions are met and automatically restart the engine when restart conditions are met. Such idle-stop systems enable fuel savings, reduction in exhaust emissions, reduction in noise, and the like. As such, a number of methods may be used to control the hydraulically operated transmission to improve idle-stops and subsequent restarts, when restart conditions are met.

In one example approach, as illustrated by Nakamori et al. in U.S. Pat. No. 6,647,326, the hydraulic pressure and flow of transmission fluid (such as engine oil) to the various clutches and gears of the transmission may be maintained using a mechanical oil pump and an auxiliary electric oil pump. Specifically herein, hydraulic line pressure is maintained by the mechanical oil pump under engine running conditions and by the auxiliary electric oil pump when the engine is stopped. That is, the electric pump is operated only under engine-off conditions to circulate transmission fluid through the transmission.

Another issue often encountered in engine starting relates to engine friction. A lower temperature of the transmission fluid, for example at engine cold start, may lead to frictional losses in the transmission, largely due to an increase in the viscosity of the fluid. Similarly, engine and differential spin losses may also be incurred due to high viscosity cold lubricating fluids. These losses, in turn, may degrade fuel economy. Accordingly, various approaches have been developed to heat engine lubricating fluids at engine cold start. One example approach is shown by Tanizawa et al. in U.S. Pat. No. 6,511,396. Herein, a heat exchanger provided in the transmission hydraulic fluid loop enables heat exchange between the transmission fluid and the engine coolant, to thereby expedite heating of the transmission fluid.

However, the inventors have recognized an interrelationship between engine friction reduction via waste heat in the context of idle stop/start vehicles where hydraulic pressure is maintained during engine shut-down.

In one example, a method is provided for heating transmission fluid in a vehicle, the vehicle comprising an engine and a transmission, the engine including a heat exchanger. The method comprises, during a first engine running condition, operating an auxiliary transmission fluid pump to generate pressure in the transmission fluid and pump transmission fluid to the heat exchanger, and during a second condition where the engine is not running (e.g., shut-down at rest), operating the auxiliary transmission fluid pump to generate pressure in the transmission fluid and pump transmission fluid to the heat exchanger.

As such, transmission fluid can be circulated at least by the auxiliary pump to receive waste engine heat during engine operating conditions, such as when the transmission fluid temperature is lower than the exhaust temperature. Thus, under these conditions, transmission fluid circulating through an auxiliary fluid loop may advantageously be more rapidly heated to reduce friction. Additionally, during idle stop conditions, the auxiliary pump can again be used to generate pressure for actuation of the transmission clutches (e.g., for improved launch control), as well as circulate fluid through the auxiliary fluid loop; yet, since the engine is not operating, overheating of the transmission fluid may be reduced (as there little, if any, waste heat other than any residual heat from a previous operation). In this way, use of the auxiliary pump may be synergistically applied to both transmission fluid initial heating and maintenance of clutch operation during idle-stop engine shutdown.

An alternative implementation routes the transmission fluid through the engine coolant (instead of, or in addition to, through the engine exhaust). In this way, the engine coolant loop itself may benefit from exhaust heat recovery.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
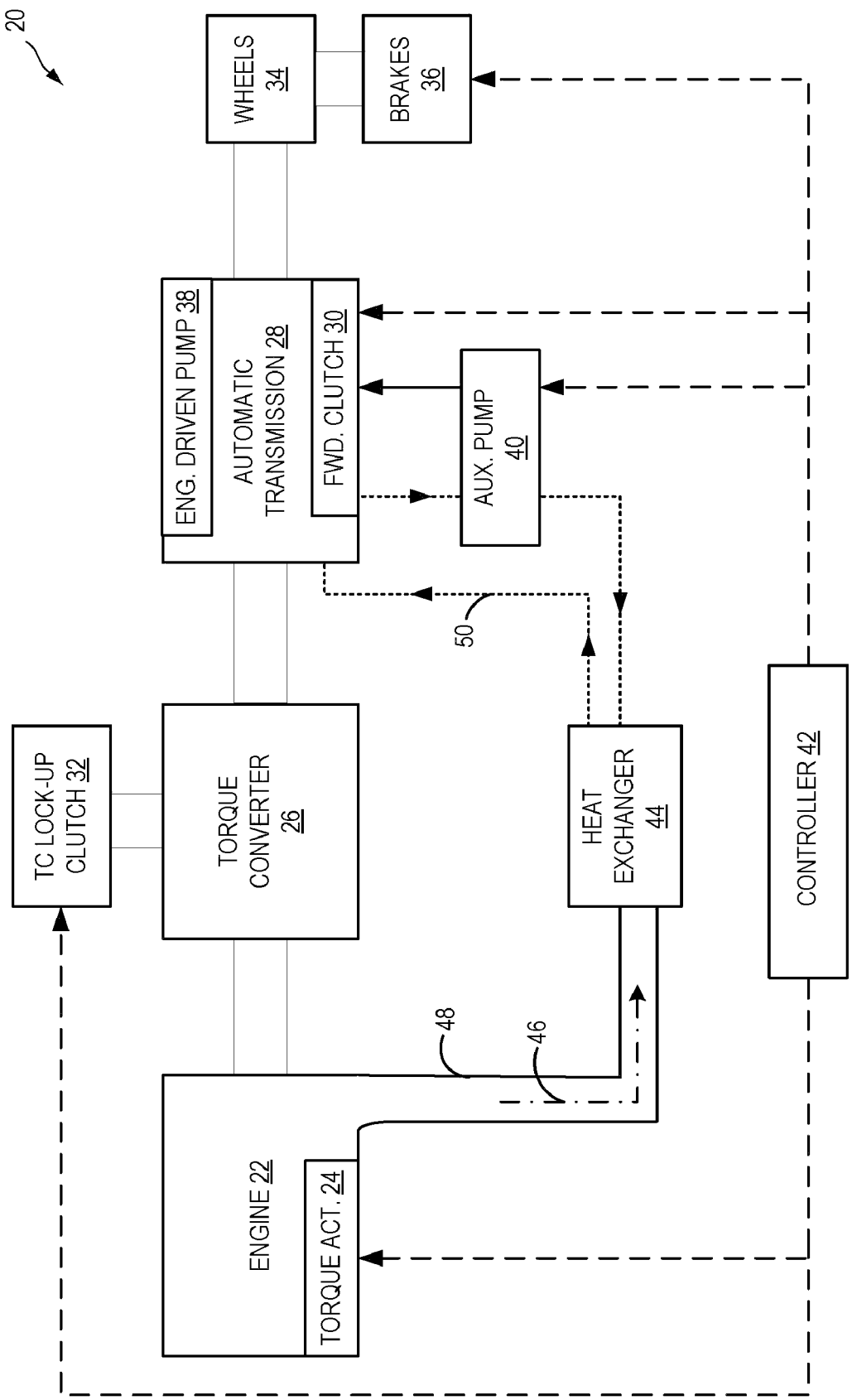
FIG. 1 shows an example vehicle system layout including a heat exchanger.
Figure 2:
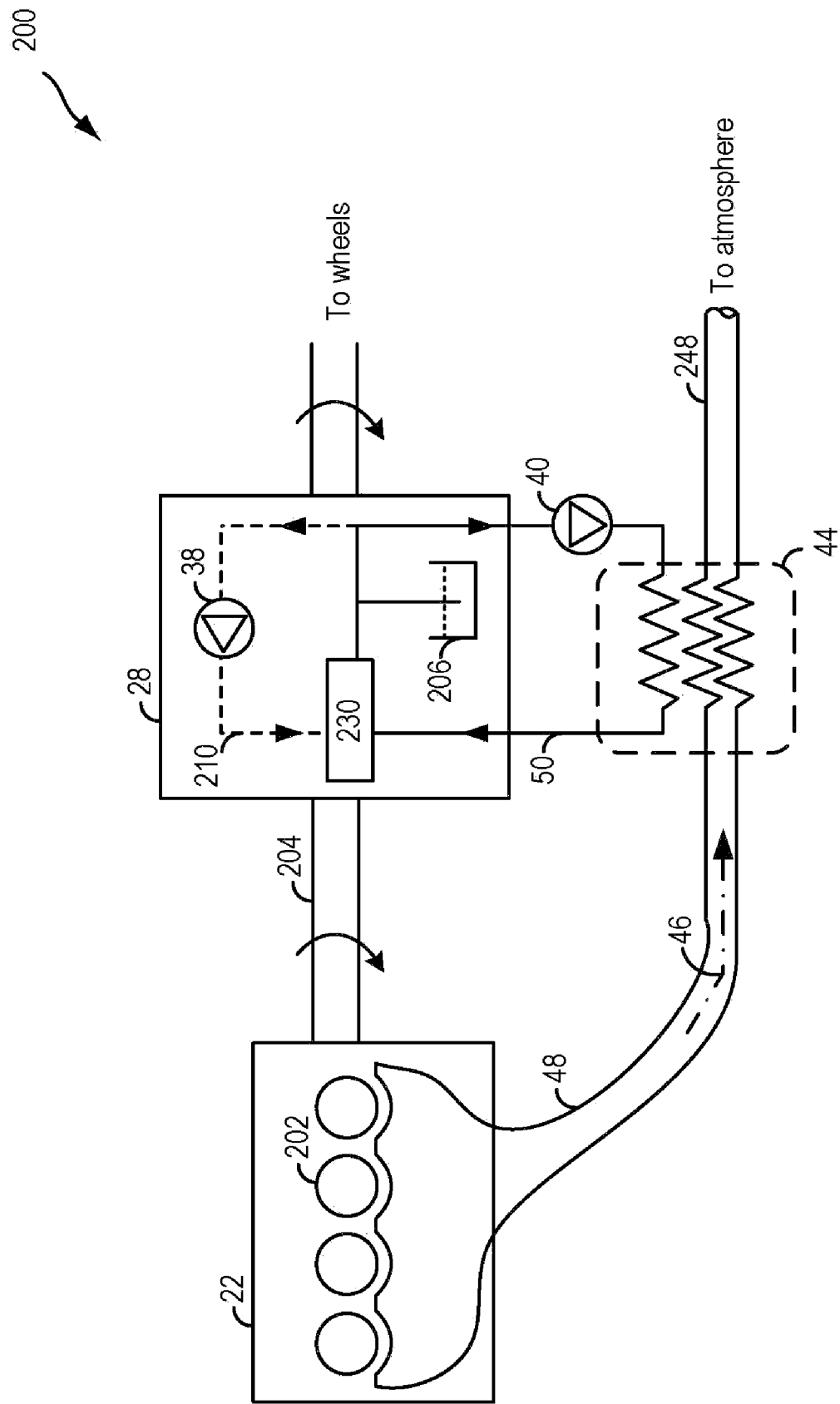
FIG. 2 shows an example embodiment of an auxiliary electric pump-operated heat exchanger according to the present disclosure.
Figure 3:
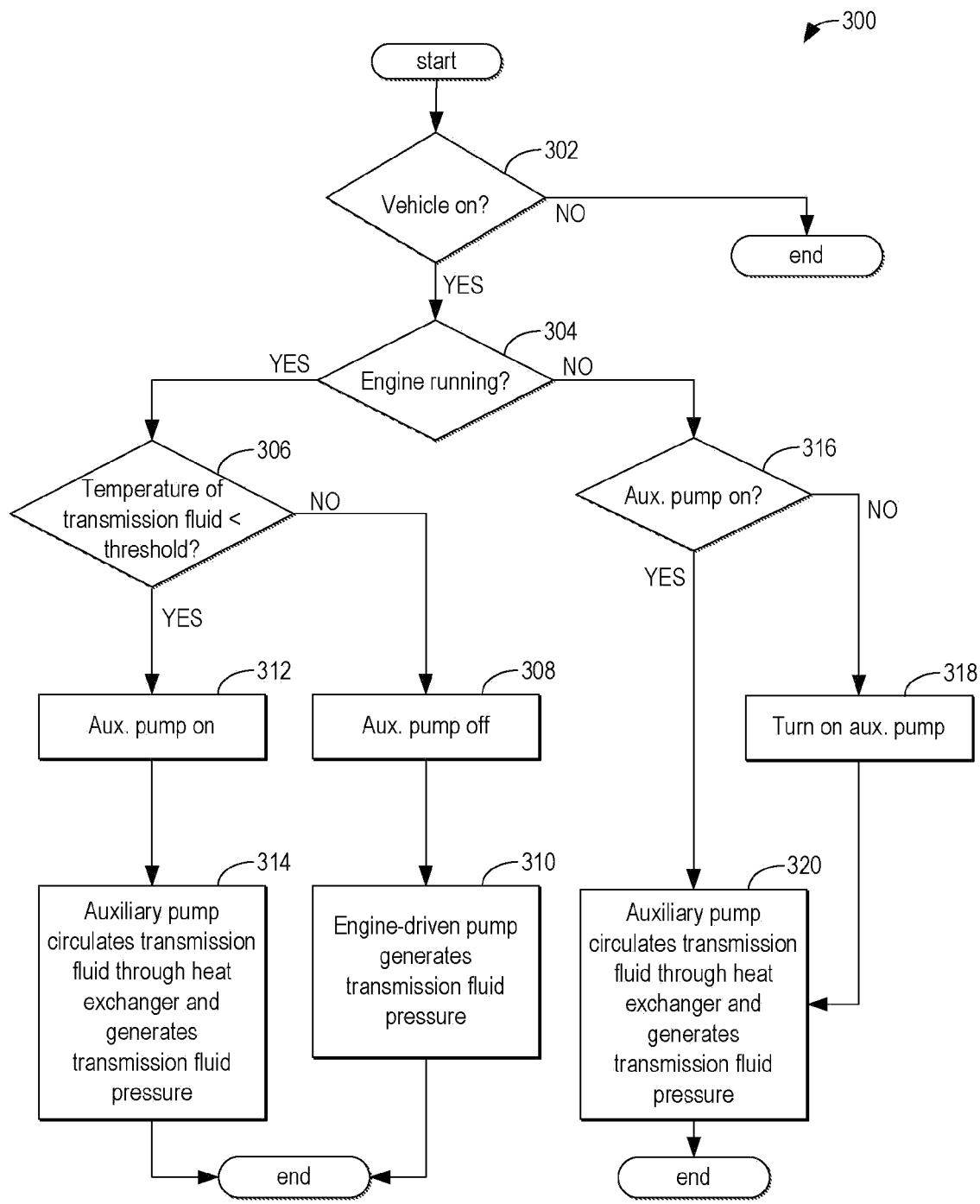
FIG. 3 shows a high level flow chart for operating the auxiliary electric pump and the electric pump-operated heat exchanger of FIG. 2 for heating transmission fluid.

The following description relates to systems and methods for expediting heating of a transmission fluid, such as at engine cold start, to thereby improve engine restart quality and provide fuel economy. Transmission fluid may be heated by passage through a heat exchanger, configured, in one example, to draw heat from engine exhaust gas, as illustrated in FIG. 1. The heat exchanger may be coupled to an auxiliary fluid loop of a vehicle's auxiliary transmission fluid pump. As shown in FIG. 2, by operating the auxiliary transmission fluid pump, cold transmission fluid may be circulated through the heat exchanger of the auxiliary fluid loop to expedite fluid heating. As shown in FIG. 3, an engine control system may be configured to operate the auxiliary pump, in response to a transmission fluid temperature being below a threshold, to expedite transmission fluid heating while also operating the auxiliary pump during engine idle-stop conditions to generate pressure in the transmission fluid for clutch actuation. In this way, use of the auxiliary pump may be synergistically applied to both transmission fluid initial heating and maintenance of clutch operation during idle-stop engine shutdown. By reducing frictional losses due to cold transmission fluid, the fuel economy of the engine may be improved.

FIG. 1 is a block diagram of a vehicle drive-train 20. Drive-train 20 may be powered by engine 22. In one example, engine 22 may be a gasoline engine. In alternate embodiments, other engine configurations may be employed, for example a diesel engine. Engine 22 may be started with an engine starting system (not shown). Further, engine 22 may generate or adjust torque via torque actuator 24, such as a fuel injector, throttle, etc.

An engine output torque may be transmitted to torque converter 26 to drive an automatic transmission 28 by engaging one or more clutches, such as forward clutch 30. As such, a plurality of such clutches may be engaged, as needed. The output of the torque converter may in turn be controlled by torque converter lock-up clutch 32. As such, when torque converter lock-up clutch 32 is fully disengaged, torque converter 26 transmits torque to automatic transmission 28 via fluid transfer between the torque converter turbine and torque converter impeller, thereby enabling torque multiplication. In contrast, when torque converter lock-up clutch 32 is fully engaged, the engine output torque is directly transferred via the torque converter clutch to an input shaft (not shown) of transmission 28. Alternatively, the torque converter lock-up clutch 32 may be partially engaged, thereby enabling the amount of torque relayed to the transmission to be adjusted. A controller may be configured to adjust the amount of torque transmitted by the torque converter by adjusting the torque converter lock-up clutch in response to various engine operating conditions, or based on a driver-based engine operation request.

Torque output from the automatic transmission 28 may in turn be relayed to wheels 34 to propel the vehicle. Specifically, automatic transmission 28 may adjust an input driving torque at the input shaft (not shown) responsive to a vehicle traveling condition before transmitting an output driving torque to the wheels.

Further, wheels 34 may be locked by engaging wheel brakes 36. In one example, wheel brakes 36 may be engaged in response to the driver pressing his foot on a brake pedal (not shown). In the same way, wheels 34 may be unlocked by disengaging wheel brakes 36 in response to the driver releasing his foot from the brake pedal.

An engine-driven transmission fluid pump 38 may be in fluid communication with the automatic transmission 28. As further elaborated with reference to FIG. 2, engine-driven transmission fluid pump 38 may be configured to circulate transmission fluid through an engine-driven pump fluid loop, thereby providing hydraulic pressure to engage the various clutches, such as forward clutch 30 and/or the torque converter lock-up clutch 32. Engine-driven fluid pump 38 may be operated in accordance with torque converter 26, and may be driven by the rotation of the engine or transmission input shaft, for example. Thus, engine-driven transmission fluid pump may operate during engine running conditions only. Furthermore, the hydraulic pressure generated in engine-driven transmission fluid pump 38 may increase as an engine speed increases, and may decrease as an engine speed decreases.

In one example, the vehicle may be equipped with an idle-stop system, wherein the engine is selectively shut-down responsive to engine idle-stop conditions (and without receiving a shut-down request from an operator), and then restarted responsive to engine restart conditions. The automatic transmission of such vehicles may be equipped with an auxiliary transmission fluid pump 40. As such, the auxiliary pump may be configured to pump transmission fluid through transmission components during conditions when the transmission engine-driven pump is not operating (such as when the vehicle is on and the engine is not running), thereby enabling the transmission to operate.

Auxiliary transmission fluid pump 40, also in fluid communication with the automatic transmission but operating independent from the driving force of the engine 22, may be configured to circulate transmission fluid, through an auxiliary fluid loop 50, thereby also providing hydraulic pressure to engage the various clutches. In one example, auxiliary transmission fluid pump 40 may be electrically powered. Herein, the auxiliary transmission fluid pump 40 may be driven by a motor (not shown) to which an electric power may be supplied, for example by a battery (not shown). During conditions where the vehicle is on but the engine is not running, for example during engine idle-stop, the auxiliary fluid pump may be operated to maintain hydraulic pressure in various clutches, to thereby enable expedited engagement of the various clutches in response to a controller request for clutch modulation.

A controller 42 may be configured to receive inputs from engine 22 and accordingly control a torque output of the engine and/or operation of the torque converter, transmission, and/or brakes. As one example, a torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 42 may control the engine torque output by controlling a combination of fuel pulse width, fuel pulse timing, and air charge. In all cases, engine control may be performed on a cylinder-by-cylinder basis to control the engine torque output. Controller 42 may also control an operation of the engine-driven transmission fluid pump and the auxiliary transmission fluid pump, in response to the inputs received from engine 22, to thereby modulate engagement of the various transmission clutches.

Now, example operation of the engine-driven and auxiliary pumps to adjust and maintain hydraulic line pressure during engine shut-down and restart will be elaborated. As such, before an idle-stop is performed, the engine idle speed may be high and one or more clutches may be maintained in an engaged state. For example, forward clutch (FC) 30 may be engaged while torque converter lock-up clutch (TCC) 32 is partially engaged or disengaged. When idle-stop conditions are confirmed, reduction of engine speed may be initiated to attain engine shut-down.

In one example, fuel injection and spark to the engine may be shut off to bring the engine to a halt. Additionally, one or more of the transmission clutches may be disengaged. Following engine shut-down, and before the engine is restarted, one or more of the transmission clutches may be maintained in an engaged or partially engaged state, to enable a rapid engine restart. The hydraulic pressure used for adjusting the engagement of the clutches during and after the engine shut-down may be adjusted by an engine controller by appropriately adjusting the output of the engine-driven fluid pump. For example, the hydraulic pressure of the transmission fluid supplied to the clutches may be increased by increasing the output of the engine-driven fluid pump. In doing so, pressure may be generated in the transmission fluid. As such, once engine shut-down occurs (that is, the engine stops running), the output of the engine-driven fluid pump may also drop.

Once engine shut-down is attained (for example, when engine speed is reduced to a near zero value), one or more clutches may be maintained in an engaged, or partially engaged state by lowering the clutch pressure. Additionally, one or more of the clutches may be disengaged. By maintaining clutch pressure at a lower level and a clutch in a partially engaged state, an expedited increase in clutch pressure and clutch engagement may be enabled in response to a driver restart request. Herein, when the engine is not running, the auxiliary fluid pump may be operated to generate pressure in the transmission fluid to maintain the partial engagement of the clutch. Specifically, the output of the auxiliary pump may be adjusted to provide a corresponding increase in clutch pressure. When a restart is requested, the output of the auxiliary pump may be immediately and rapidly increased to enable the clutch pressure to be increased and the clutch(es) to be rapidly engaged. Once the clutch has been engaged, the clutch pressure may be reduced to a lower value, for example a hold value. Similarly, after engagement, the output of the auxiliary pump may be reduced and maintained at a lower base value. Since the output of the engine-driven fluid pump is dependent on the engine output, the engine-driven pump may resume operation to generate hydraulic line pressure once the engine speed has been raised. Thereafter, the operation of the auxiliary pump may be discontinued.

Auxiliary fluid pump 40 may also be in fluid communication with a heat exchanger 44. In response to engine operating conditions, such as a transmission fluid temperature, auxiliary fluid pump 40 may be configured to circulate cold transmission fluid along auxiliary pump fluid loop 50 and heat exchanger 44, to enable expedited initial heating of the fluid. Heat exchanger 44 may be coupled to the exhaust manifold 48 of engine 22. Herein, heat exchanger 44 may transfer heat from (heated) exhaust gas 46 to the cold transmission fluid. As such, various heat exchanger configurations may be employed. In one example, the heat exchanger may include a tube or conduit of the auxiliary fluid loop coupled adjacent to the engine exhaust (as further illustrated in FIG. 2). In alternate embodiments, heat exchanger 44 may be coupled to an engine coolant system (not shown). Herein, the heat exchanger may transfer hear from heated engine coolant to the transmission fluid. As further elaborated with reference to FIGS. 2-3, controller 42 may adjust operation of the pumps and circulation of transmission fluid through the engine-driven pump fluid loop or the auxiliary pump fluid loop responsive to a temperature of the transmission fluid. In doing so, the auxiliary pump may be operated under specified conditions for both generating hydraulic line pressure and heating cold transmission fluid.

In another example configuration, the transmission fluid may be routed through a heat exchanger coupled with the engine coolant (instead of, or in addition to, heating through the engine exhaust). In this way, the engine coolant loop itself may benefit from exhaust heat recovery. Further still, the approach may also be applied to an intermediate fluid that is not engine coolant. Also a diverter valve may be used to selectively operate a transmission fluid circuit as a heating or cooling circuit. (A diverter valve is not needed if the transmission fluid is routed into engine coolant because the desired transmission fluid temperature may be close to regulated coolant temperature.) Since transmission fluid heating or cooling is typically used transiently, powering such a circuit electrically instead of mechanically may provide an energy consumption benefit.

Now turning to FIG. 2, an embodiment 200 of the auxiliary transmission fluid pump-operated heat exchanger is described. It will be appreciated that like numbered components previously introduced in FIG. 1 may be referenced similarly in FIG. 2.

A torque output from engine 22 is coupled to transmission 28 along transmission input shaft 204. The output from transmission 28 may then be relayed to the wheels to propel the vehicle.

Engine 22 is shown with a plurality of cylinders 202 (herein four). Heated exhaust gas 46 generated during combustion in cylinders 202 may flow into exhaust manifold 48. From here, the exhaust gas may be expelled to the atmosphere through tailpipe 248. Due course, the heated exhaust gas may flow through heat exchanger 44. Heat exchanger 44 may draw heat from exhaust gas 46 and use it to heat the circulating transmission fluid.

Transmission 28 includes an engine-driven transmission fluid pump 38 configured to pump transmission fluid from sump 206 to the various hydraulic transmission components, including clutches 230. Specifically, engine-driven transmission fluid pump 38 operates to circulate transmission fluid through an engine-driven pump fluid loop 210 (dotted lines). Herein, transmission fluid is drawn from sump 206 by the engine-driven transmission fluid pump, and is used to modulate the engagement of clutches 230 (for example, a forward clutch and/or a torque converter lock-up clutch), before being returned to the sump.

Transmission 28 further includes auxiliary (electrically powered) transmission fluid oil pump 40 also configured to pump transmission fluid from sump 206 to the various hydraulic transmission components, including clutches 230. Specifically, auxiliary transmission fluid pump 40 operates to circulate transmission fluid through an auxiliary pump fluid loop 50 (solid lines). Herein, transmission fluid is drawn from sump 206 by the electric pump, and then flown through heat exchanger 44 wherein the transmission fluid may be heated. In one example, as depicted, the heat exchanger may comprise coupling a tube or conduit of the auxiliary pump fluid loop adjacent to the engine exhaust manifold. However, it will be appreciated that alternate heat exchanger configurations may be employed. The heated transmission fluid may then be circulated to clutches 230. A check valve (not shown) with a low cracking pressure may be optionally positioned in the auxiliary pump fluid loop to prevent natural convective flow in the loop from heating the transmission fluid.

It will be appreciated that, as depicted, engine-driven pump fluid loop 210 and auxiliary pump fluid loop 50 depict distinct circulation loops such that transmission fluid circulating through engine-driven pump fluid loop 210 may not come in contact with auxiliary pump 40 or heat exchanger 44.

As previously elaborated, engine-driven transmission fluid pump 38 and auxiliary transmission fluid pump 40 may be operated to generate a hydraulic pressure in the transmission fluid and apply the pressure to engage/disengage one or more of the transmission clutches 230. As further elaborated herein, auxiliary transmission fluid pump 40 may also be operated to enable initial heating of the transmission fluid. A temperature sensor coupled to the fluid loops, for example to sump 206, may provide the engine controller with an estimate of the transmission fluid temperature. Alternatively, transmission fluid temperature may be inferred from engine operating conditions. The controller may then adjust operation of the pumps in response to the transmission fluid temperature being above or below a threshold, in addition to adjusting operation of the pumps responsive to a driver torque request.

In one example, during a (first) condition, where the temperature of the transmission fluid is below the threshold, an engine controller may operate the auxiliary transmission fluid pump to pump cold transmission fluid to the heat exchanger 44. Specifically, heat from hot exhaust generated in the engine 22 may be transferred to the heat exchanger 44 wherefrom the heat may be transferred to the cold transmission fluid. Heat exchanger 44 may be positioned sufficiently down tailpipe 248 to limit the amount of heat transferred and thus the maximum temperature to which the transmission fluid may be subjected to. In an alternate embodiment, as elaborated below, the amount of heat transferred may be limited by the use of an intermediate fluid, such as an intermediate engine coolant. Additionally, during the first engine running condition, the auxiliary transmission fluid pump may be operated to generate pressure in the transmission fluid to engage/disengage and/or modulate the engagement of one or more of the transmission clutches. As one example, the first running condition may include an engine cold start operation, such as during an engine restart from idle-stop in response to engine restart conditions.

In another example, during a second condition where the vehicle is on but the engine is not running, and consequently the engine-driven transmission fluid pump is also not operating, the engine controller may operate the auxiliary transmission fluid to generate and maintain pressure in the transmission fluid so that the clutches may be engaged quickly in response to a controller demand for clutch engagement, such as in response to an engine restart request. As one example, the second condition may include an engine idle-stop where the engine is selectively shut-down responsive to engine idle-stop conditions and without receiving a shutdown request from the vehicle operator. Herein, in addition to maintaining pressure in the transmission fluid, the auxiliary transmission fluid pump may also pump transmission fluid to the heat exchanger. However, given that the engine is not running, a substantially reduced amount of exhaust heat may be generated. Consequently, the heat transferred under these conditions from heat exchanger 44 to transmission fluid flowing through the auxiliary pump fluid loop may be negligible and may not lead to transmission fluid over-heating.

In yet another example, during a third engine running condition, where the temperature of the transmission fluid is above the threshold, the engine controller may discontinue or not operate the auxiliary transmission fluid pump, and instead operate the engine-driven transmission fluid pump to generate pressure in the transmission fluid to engage/disengage and/or modulate the engagement of one or more of the transmission clutches. As one example, the third running condition may include an engine operation following a cold start operation. By discontinuing auxiliary fluid pump operation in response to the transmission fluid temperature being above the threshold, transmission fluid flow through the auxiliary pump fluid loop may be stopped, thereby avoiding further contact between the heated transmission fluid and the heat exchanger. In doing so, overheating of the transmission fluid may be reduced.

While the depicted embodiment shows the heat exchanger of the auxiliary fluid loop coupled to the engine exhaust, in an alternate embodiment, in addition to, or instead of, being coupled to the engine exhaust, the heat exchanger of the auxiliary pump fluid loop may be coupled to the engine coolant system. Accordingly, transmission fluid may be circulated by the auxiliary pump to, additionally or optionally, receive waste heat from an engine coolant system. As such, in this embodiment, the engine coolant loop may also benefit from exhaust heat recovery. In still further embodiments, the method may be implemented with an intermediate fluid that is not engine coolant. A diverter valve may be incorporated into the auxiliary fluid loop to enable the heating circuit to be converted into a cooling circuit, as needed. Since a need for transmission fluid heating or cooling is usually transient, by powering such a circuit electrically (using the auxiliary pump) instead of mechanically (using the engine-driven pump), energy consumption benefits may also be achieved. In still further embodiments, a heat pipe with an intermediate fluid may be used to take advantage of the natural tendency of heat pipes to stop transferring heat when the working fluid is over-heated.

A controller may be configured to adjust operation of the auxiliary and engine-driven mechanical transmission fluid pumps responsive to engine operating conditions including a transmission fluid temperature, as further elaborated below with reference to the example routine 300 of FIG. 3.

At 302, it is confirmed whether the vehicle is on. If the vehicle is not on, the routine may end. At 304, it is determined whether the engine is running. If the engine is running, then at 306, the temperature of the transmission fluid may be estimated, inferred, and/or measured and it may be determined whether the temperature is below a threshold. In one example, during a first engine running condition, the temperature of the transmission fluid may be below a threshold (such as during an engine cold start). If the temperature of the transmission fluid is below the threshold, then at 312, the auxiliary transmission fluid pump may be turned on. In one example, this may include starting a battery operated motor of the pump. At 314, the auxiliary transmission fluid pump may be operated to pump and circulate cold transmission fluid through the auxiliary fluid pump loop, from the transmission to the heat exchanger to expedite initial heating of the transmission fluid. Additionally, the pump may also generate and maintain pressure in the transmission fluid to enable clutch modulation.

During a (third) condition where the temperature of the transmission fluid is above the threshold, that is the transmission fluid is already heated, at 308, the auxiliary transmission fluid pump may be switched off to prevent any contact between the already heated transmission fluid and the heat exchanger. In this way, over-heating of the transmission fluid may be reduced. At 310, the transmission engine-driven pump may be operated to circulate transmission fluid through the engine-driven pump fluid loop. Herein, the transmission fluid may be circulated through transmission components, such as a variety of clutches, to thereby generate and maintain transmission fluid pressure for clutch modulation. The engine-driven fluid pump loop may optionally be coupled to a transmission fluid cooling loop, for example a cooling loop coupled to the engine coolant, to enable cooling of overheated transmission fluid.

If at 304 it is determined that the engine is not running, then at 316, it may be confirmed whether the auxiliary transmission fluid pump is operating. As previously elaborated, the auxiliary transmission fluid pump may be operated under conditions where the engine is not running, and hence the engine-driven transmission fluid pump is unable to operate. During a (second) condition where the auxiliary transmission fluid pump is not operating at 316, at 318, the auxiliary transmission fluid pump may be turned on. At 320, the auxiliary transmission fluid pump may be operated to circulate transmission fluid through the auxiliary pump fluid loop. Herein, the transmission fluid may be circulated through transmission components, such as a variety of clutches, to thereby generate and maintain transmission fluid pressure, and enable an expedited engagement of clutches in response to a controller demand for clutch engagement. Additionally, the pump may also circulate transmission fluid through the auxiliary pump fluid loop and the heat exchanger. However, given that under conditions where the engine is not running, the exhaust heat generated is substantially lower, overheating of the transmission fluid may be averted.

In this way, during engine cold start, an auxiliary transmission fluid pump of the transmission may be advantageously used to rapidly transfer exhaust heat to cold transmission fluid. By expediting initial fluid heating, frictional losses related to high viscosity fluid may be reduced. In this way, use of the auxiliary pump may be synergistically applied to both transmission fluid initial heating and maintenance of clutch operation during idle-stop engine shutdown. By extending use of an existing auxiliary fluid pump and auxiliary pump fluid loop to circulate the cold transmission fluid through an exhaust heat exchanger, initial fluid heating may be enabled without the need for additional hardware components and control systems, thereby reducing cost and complexity in the system.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for heating transmission fluid in a vehicle with an engine comprising,
    during engine running conditions, operating an auxiliary transmission fluid pump to generate pressure in the transmission fluid and pump transmission fluid to a heat exchanger while flowing exhaust gas to the heat exchanger; and
    during engine not running conditions, operating the auxiliary transmission fluid pump to generate pressure in the transmission fluid and pump transmission fluid to the heat exchanger.

2. The method of claim 1 wherein the auxiliary transmission fluid pump is electrically powered.

3. The method of claim 1 wherein the heat exchanger transfers heat from exhaust gas of an exhaust conduit to the transmission fluid.

4. The method of claim 3 wherein the heat exchanger includes a conduit enclosing the transmission fluid coupled adjacent to the engine exhaust conduit.

5. The method of claim 1 wherein the engine running conditions include a condition where a temperature of the transmission fluid is below a threshold.

6. The method of claim 5 wherein the engine running conditions include an engine cold start operation.

7. The method of claim 6 wherein the engine not running conditions include a condition where the engine is selectively shut-down responsive to engine idle-stop conditions and without receiving an engine shutdown request from an operator.

8. The method of claim 7 further comprising, during other engine running conditions, operating an engine-driven transmission fluid pump to generate pressure in the transmission fluid.

9. The method of claim 8 wherein the other engine running conditions include a condition where the temperature of the transmission fluid is above the threshold, and wherein operating the engine-driven transmission fluid pump includes not operating the auxiliary transmission fluid pump.

10. A vehicle system, comprising:
    an automatic transmission including an engine-driven fluid pump and an auxiliary fluid pump, the pumps configured to pump transmission fluid through the transmission and an oil circuit;
    a heat exchanger coupled to an engine exhaust and coupled to the oil circuit; and
    a control system configured to,
        selectively shut-down an engine responsive to engine idle-stop conditions and without receiving an engine shutdown request from an operator, and restart the engine from the engine shut-down responsive to restart conditions;
        operate the auxiliary fluid pump to generate pressure in the transmission fluid and pump transmission fluid to the heat exchanger during a first engine running condition where a temperature of the transmission fluid is below a threshold;
        operate the auxiliary fluid pump to generate pressure in the transmission fluid and pump transmission fluid to the heat exchanger during a second condition where the engine is shut-down responsive to the engine idle-stop conditions; and
        operate the engine-driven fluid pump to generate pressure in the transmission fluid during a third engine running condition where the temperature of the transmission fluid is above the threshold.

11. The system of claim 10 wherein the auxiliary fluid pump is electrically powered.

12. The system of claim 11 wherein the first engine running condition includes an engine cold start operation.

13. The system of claim 12 wherein operating the engine-driven fluid pump during the third engine running condition includes not operating the auxiliary fluid pump.

14. A method for heating transmission fluid in a vehicle with an engine, comprising,
    during engine running conditions, operating an auxiliary transmission fluid pump to generate pressure in the transmission fluid and pump transmission fluid to a heat exchanger via a transmission fluid circuit while flowing exhaust gas to the heat exchanger; and during engine not running conditions, operating the auxiliary transmission fluid pump to generate pressure in the transmission fluid and pump transmission fluid to the heat exchanger, wherein a diverter valve selectively operates the transmission fluid circuit as a transmission heating and transmission cooling circuit.

15. The method of claim 14 wherein the auxiliary transmission fluid pump is electrically powered.

16. The method of claim 15 wherein the engine running conditions include a condition where a temperature of the transmission fluid is below a threshold.

17. The method of claim 16 wherein the engine running conditions include an engine cold start operation.

* * * * *